United States Patent
NA

(10) Patent No.: US 8,009,447 B2
(45) Date of Patent: Aug. 30, 2011

(54) ENERGY EFFECTIVE SWITCHING POWER SUPPLY APPARATUS AND AN ENERGY EFFECTIVE METHOD THEREOF

(75) Inventor: Tae-kwon NA, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/611,400

(22) Filed: Nov. 3, 2009

(65) Prior Publication Data

US 2010/0046254 A1 Feb. 25, 2010

Related U.S. Application Data

(63) Continuation of application No. 11/277,659, filed on Mar. 28, 2006, now Pat. No. 7,663,896.

(30) Foreign Application Priority Data

Sep. 27, 2005 (KR) .................................. 2005-89890

(51) Int. Cl.
*H02M 3/335* (2006.01)
*H02H 7/122* (2006.01)
(52) U.S. Cl. ................. 363/56.01; 363/21.15; 363/21.07
(58) Field of Classification Search .................... 363/16, 363/21.01, 21.07, 21.08, 21.1, 21.15, 21.16, 363/21.18, 56.01, 56.09, 56.1
See application file for complete search history.

(56) References Cited

U.S. PATENT DOCUMENTS

| 4,975,823 | A | 12/1990 | Rilly et al. | |
|---|---|---|---|---|
| 5,835,363 | A | 11/1998 | Chen | |
| 6,232,964 | B1 | 5/2001 | Lee | |
| 6,728,117 | B2 | 4/2004 | Schemmann et al. | |
| 6,813,170 | B2 | 11/2004 | Yang | |
| 7,663,896 | B2 * | 2/2010 | Na ............................. | 363/56.01 |
| 2002/0146253 | A1 | 10/2002 | Kondo et al. | |
| 2007/0164717 | A1 | 7/2007 | Osaka | |

FOREIGN PATENT DOCUMENTS

| CN | 1309458 | 8/2001 |
|---|---|---|
| CN | 1357964 | 7/2002 |
| JP | 2000-324834 | 11/2000 |
| KR | 98-5687 | 3/1998 |
| KR | 2000-59690 | 10/2000 |
| KR | 2003-67153 | 8/2003 |

* cited by examiner

*Primary Examiner* — Jessica Han
(74) *Attorney, Agent, or Firm* — Stanzione & Kim, LLP

(57) ABSTRACT

An energy effective switching power supply apparatus and an energy effective method thereof. The energy effective switching power supply apparatus includes a power transforming part having first and second coils to induce a voltage to the second coil using interactions between the first and the second coils with respect to the input voltage, a power outputting part to output a sensing signal when it is determined that a first DC voltage output by rectifying and smoothing the voltage induced to the second coil is greater than or equal to a reference voltage level, and a switching controlling part to adjust a switching frequency of a switching device to interrupt a current flowing in the first coil of the power transforming part when the sensing signal is received. Accordingly, a switching loss is controlled and an energy loss is reduced.

5 Claims, 4 Drawing Sheets

US 8,009,447 B2

ENERGY EFFECTIVE SWITCHING POWER SUPPLY APPARATUS AND AN ENERGY EFFECTIVE METHOD THEREOF

CROSS-REFERENCE TO RELATED APPLICATIONS

This application is a continuation of prior application Ser. No. 11/277,659, filed on Mar. 28, 2006 now U.S. Pat. No. 7,663,896 in the U.S. Patent and Trademark Office, the disclosure of which is incorporated herein by reference in its entirety. This application claims the benefit of Korean Patent Application No. 2005-89890, filed on Sep. 27, 2005 in the Korean Intellectual Property Office, the disclosure of which is incorporated herein by reference in its entirety.

BACKGROUND OF THE INVENTION

1. Field of the Invention

The present general inventive concept relates to an energy effective switching power supply apparatus and an energy effective method thereof. More particularly, the present general inventive concept relates to an energy effective switching power supply apparatus and an energy effective method thereof that saves energy by improving power efficiencies of an SMPS (Switching Mode Power Supply) used as a switching power apparatus in electronics appliances.

2. Description of the Related Art

Generally, an SMPS (Switching Mode Power Supply) is used as a switching power supply apparatus in an image forming apparatus, such as a printer. The SMPS refers to an apparatus that rectifies an AC (alternating current) voltage externally input and supplies the rectified voltage to each part of an electronics appliance.

The SMPS reduces power loss by having a switching device operating in a switching mode to reduce power loss, and is compact-sized by use of a high frequency power transformer. The SMPS is designed to simultaneously output DC voltages (Direct current) having different amplitudes. For example, it is possible to simultaneously output DC voltages of 3.3V or 5V supplied to a main power supply in a printer, and a DC voltage of 24V supplied to a HVPS (High Voltage Power Supply) and a printing engine part.

FIG. 1 illustrates a conventional switching power supply apparatus.

Referring to FIG. 1, the switching power supply apparatus includes an external power inputting part 10, a rectifying part 20, a switching controlling part 30, a power transforming part 40, a first power outputting part 50, a second power outputting part 60, and a feedback circuit part 70.

The external power inputting part 10 receives an AC power from an external power supply (not shown) as an input. The rectifying part 20 rectifies the input AC power using a bridge diode (not shown) and a capacitor (not shown), and outputs a DC power. The DC power output from the rectifying part 20 is supplied to a first coil of a power transformer of the power transforming part 40, and the power transforming part 40 induces a voltage to a second coil by interactions between the first coil and the second coil.

The switching controlling part 30 interrupts electric current flowing in the first coil of the power transforming part 40 and controls the voltage induced to the second coil of the power transforming part 40. The voltage induced to the second coil of the power transforming part 40 is rectified and smoothed by a first power outputting part 50 and a second power outputting part 60, respectively. The first power outputting part 50 outputs a first DC voltage Va as a first output voltage, and the second power outputting part 60 outputs a second DC voltage Vb as a second output voltage.

The switching controlling part 30 has a PWM-IC (Pulse Width Modulation-integrated Circuit) 35, and the PWM-IC 35 is connected to the first coil of the power transforming part 40 through a transistor TR1. An OUT terminal of the PWM-IC 35 turns on/off the transistor TR1, interrupts the current flowing in the first coil and controls the voltage induced to the second coil of the power transforming part 40.

A diode D1, a resistance R1, and a first capacitor C1 rectify and smooth a current flowing in an auxiliary coil of the power transforming part 40 and supply an operating power to a Vcc terminal of the PWM-IC 35. A switching frequency is determined with respect to the transistor TR1 output to the OUT terminal by a capacitance of a second capacitor C2 connected to a CT terminal of the PWM-IC 35.

The feedback circuit part 70 senses the second output voltage of the second power outputting part 60 and transmits a feedback signal to an FB terminal of the PWM-IC 35. An operation of the PWM-IC 35 is determined according to the transmitted feedback signal. That is, when the second output voltage of the second power outputting part 60 is higher than a reference voltage, the feedback circuit part 70 transmits a feedback signal instructing the PWM-IC 35 to stop operating.

Likewise, the conventional switching power supply apparatus switches the transistor TR1 ON or OFF at a uniform frequency all the time, regardless of changes of the first and second output voltages Va and Vb, respectively, and accordingly, a switching loss is incurred and unnecessary power consumption occurs. If an output current of the first power outputting part 50 rises, the second output voltage of the second power outputting part 60 rises by cross regulation, and an apparatus that is supplied with the second output voltage by the second power outputting part 60 may be damaged by the increase in the second output voltage.

SUMMARY OF THE INVENTION

The present general inventive concept provides an energy effective switching power supply apparatus and an energy effective method thereof to adjust a switching frequency of a PWM-IC (Pulse Width Modulation-integrated Circuit) in order to prevent unnecessary power consumption and damages caused by overvoltage.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing a switching power supply apparatus including a power transforming part having first and second coils to induce voltage to the second coil using interactions between the first and the second coils with respect to an input voltage received on the first coil, a power outputting part to output a sensing signal when it is determined that a first DC voltage output by rectifying and smoothing the voltage induced to the second coil is greater than or equal to a reference voltage level, and a switching controlling part to adjust a switching frequency of a switching device to interrupt a current flowing in the first coil of the power transforming part when the sensing signal is received.

The power outputting part may output the sensing signal by operating an LED (Light Emitting Diode) when the first DC voltage output is greater than or equal to the reference voltage level.

A capacitance may be changed by a photo transistor operated by the LED to serve as a photo coupler, and the switching controlling part may adjust the switching frequency of the switching device based on the changed capacitance.

When the first DC voltage is greater than or equal to the reference voltage level, the LED of the power outputting part is operated by a photo programmable shunt diode.

The foregoing and/or other aspects of the present general inventive concept may also be achieved by providing a power supply apparatus, including a transformer to receive an input voltage at a first coil and to output at least one output voltage on at least one second coil, a controller to switch the transformer ON and OFF at two or more operating frequencies to regulate the at least one output voltage according to a feedback signal, and at least one power output part to receive the at least one output voltage from the transformer, to output at least one output DC voltage, and to provide a first feedback signal to the controller to decrease the frequency with which the transformer is switched when the at least one output DC voltage is greater than a reference voltage level.

The foregoing and/or other aspects of the present general inventive concept may also be achieved by providing an energy effective method of a switching power supply apparatus, the method including receiving an input voltage on a first coil of a power transforming part including the first coil and a second coil, inducing a voltage to the second coil using interactions between the first and the second coils with respect to the input voltage, outputting a sensing signal when a DC voltage output by rectifying and smoothing the voltage induced to the second coil is determined to be greater than or equal to a reference voltage level, and adjusting a switching frequency of a switching device to interrupt a current flowing in the first coil when the sensing signal is received.

The outputting of the sensing signal may include outputting the sensing signal by operating an LED when the DC voltage is greater than or equal to the reference voltage level.

The adjusting of the switching frequency of the switching device may include changing a capacitance by operating a photo transistor with the LED to serve as a photo coupler.

The outputting of the sensing signal may include operating the LED with a photo programmable shunt diode when the DC voltage is greater than or equal to the reference voltage level.

The foregoing and/or other aspects of the present general inventive concept may also be achieved by providing a method of switching power, the method including transforming an input voltage received on a first coil of a transformer to induce at least one output voltage on a second coil, interrupting current flowing through the first coil of the transformer and inducement of the at least one output voltage on the second coil according to a switching control signal, rectifying the at least one output voltage induced on the second coil to at least one DC output voltage, determining whether the at least one DC output voltage is greater than a reference voltage, and operating a photocoupler to adjust a frequency of the switching control signal when it is determined that the at least one DC output voltage is greater than the reference voltage.

BRIEF DESCRIPTION OF THE DRAWINGS

The above aspects of the present general inventive concept will be more apparent by describing certain embodiments of the present general inventive concept with reference to the accompanying drawings, in which.

DETAILED DESCRIPTION OF THE PREFERRED EMBODIMENTS

Figure 1:
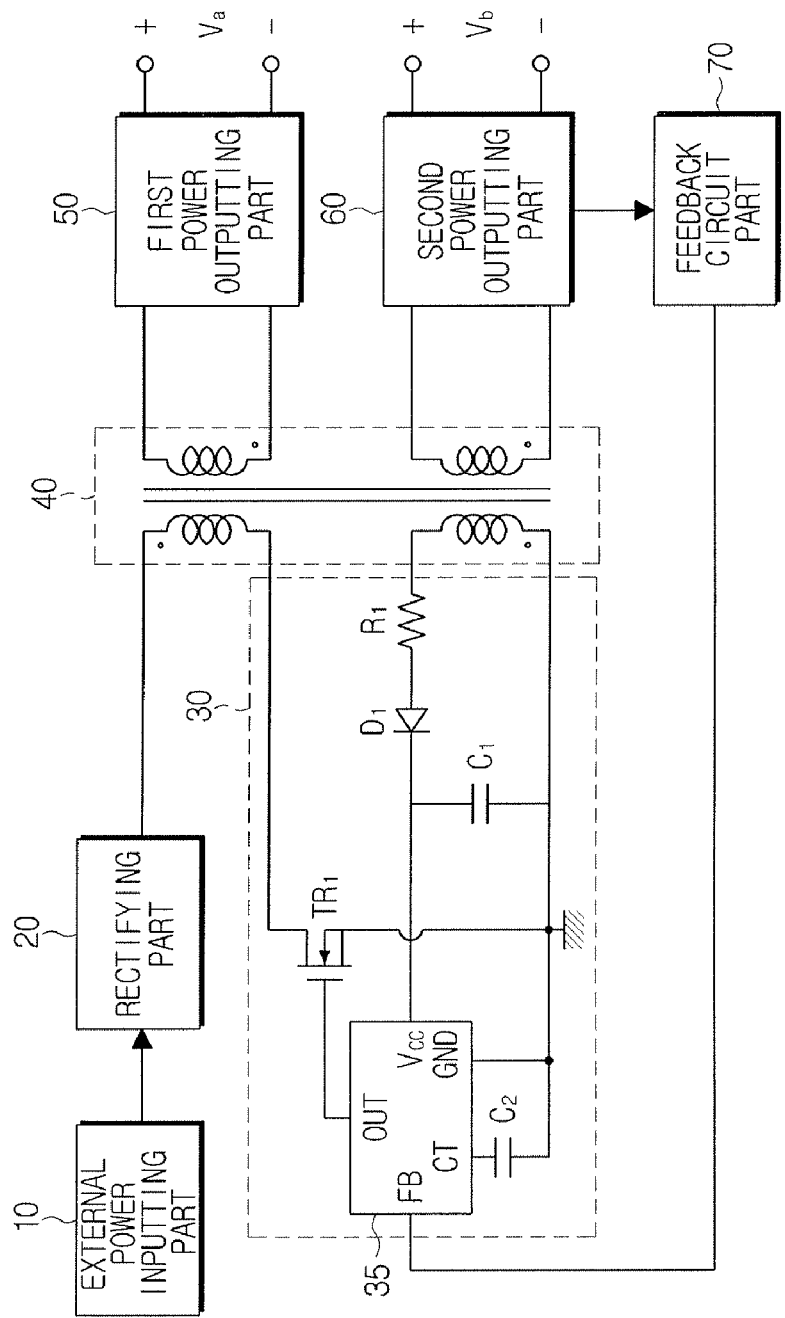
FIG. 1 illustrates a conventional switching power supply apparatus.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
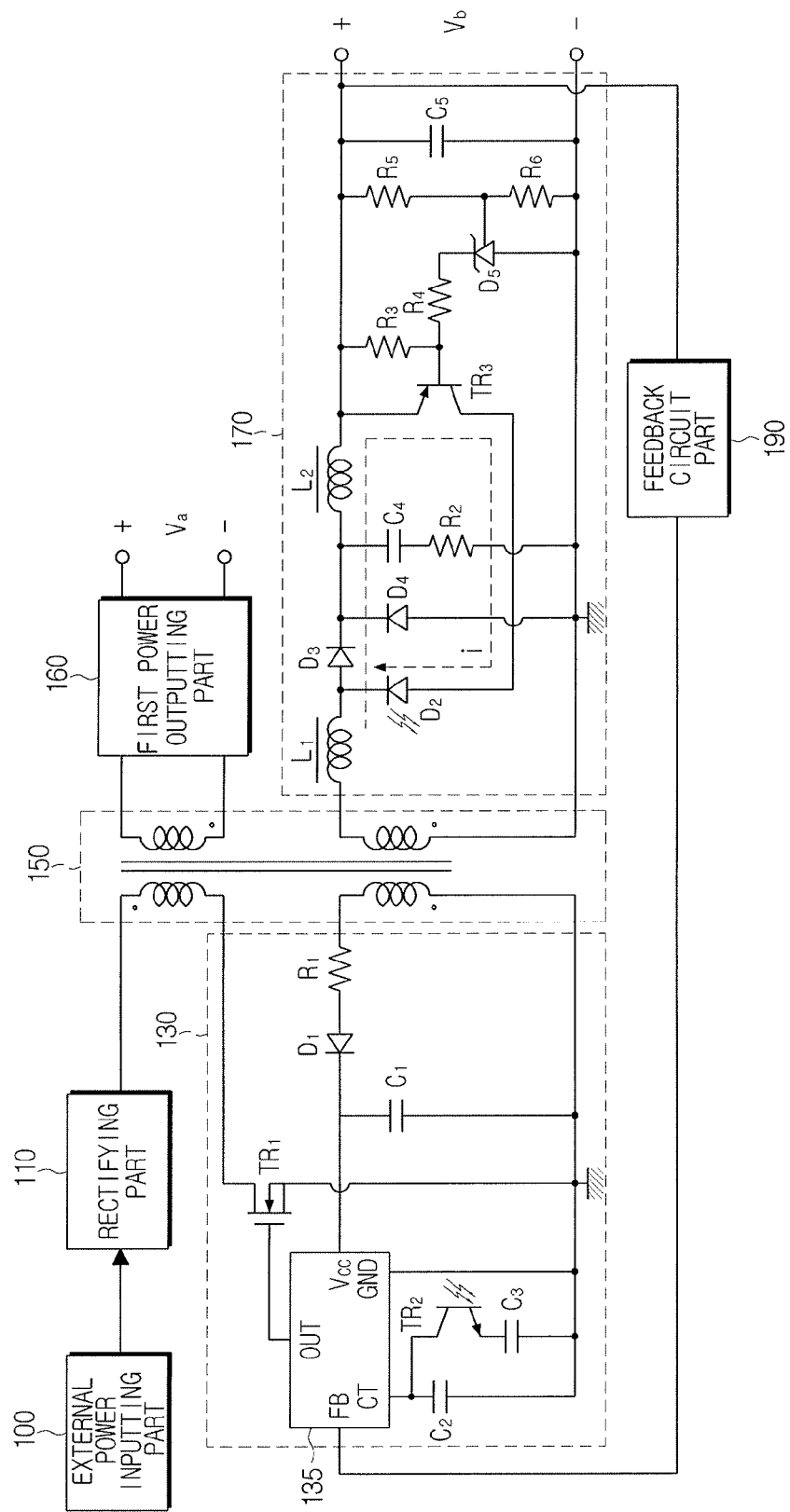
FIG. 2 illustrates a switching power supply apparatus according to an embodiment of the present general inventive concept.

FIG. 2 illustrates a switching power supply apparatus according to an embodiment of the present general inventive concept.

Referring to FIG. 2, the switching power supply apparatus includes an external power inputting part 100, a rectifying part 110, a switching controlling part 130, a power transforming part 150, a first power outputting part 160, a second power outputting part 170, and a feedback circuit part 190.

The external power inputting part 100 receives an AC (Alternating Current) power from an external power supply (not shown) as an input.

The rectifying part 110 rectifies the input AC power and outputs a DC (Direct Current) voltage (power) using, for example, a bridge diode (not shown) and a capacitor (not shown). The DC voltage output from the rectifying part 110 is supplied to a first (or primary) coil of the power transforming part 150.

The power transforming part 150 induces a voltage to a second (or secondary) coil and an auxiliary coil by interactions between the first coil and the second coil. The auxiliary coil is connected to the switching controlling part 130.

The switching controlling part 130 interrupts a current flowing through the first coil of the power transforming part 150, thereby controlling the voltage induced to the second coil and the auxiliary coil of the power transforming part 150. The switching controlling part 130 includes a PWM-IC (Pulse Width Modulation-integrated Circuit) 135, transistors TR1 and TR2, capacitors C1, C2, and C3, diodes D1 and D2, and a resistance R1.

The PWM-IC 135 is connected to one end of the first coil of the power transforming part 150 through the transistor TR1. The transistor TR1 may be a MOSFET (Metal oxide Semiconductor Field Effect). An OUT terminal of the PWM-IC 135 controls the voltage induced to the second coil and the auxiliary coil of the power transforming part 150 by turning the transistor TR1 ON and OFF, thereby interrupting the current of the first coil.

The diode D1, the resistance R1, and the capacitor C1 rectify and smooth a current flowing in the auxiliary coil of the power transforming part 150 and supply a Vcc terminal of the PWM-IC 135 with operating power to operate the PWM-IC 135.

A CT terminal of the PWM-IC 135 determines a switching frequency output to the OUT terminal of the PWM-IC 135, and the switching frequency is determined by a capacitance of the capacitor C2 connected to the CT terminal. The transistor TR2 may be a phototransistor. When the phototransistor TR2 turns OFF in FIG. 2, the switching frequency is determined by the capacitance C2. When the phototransistor TR2 turns ON, the switching frequency is determined by the capacitances C2 and C3. Since the capacitance at the CT terminal of the PWM-IC 135 increases by parallel connections between the capacitors C2 and the C3, the switching frequency decreases.

The voltage induced to the second coil of the power transforming part 150 is rectified and smoothed at the first and second power outputting parts 160 and 170, respectively. The first power outputting part 160 outputs a first DC voltage Va as a first output voltage, and the second power outputting part 170 outputs a second DC voltage Vb as a second output voltage. The switching power supply apparatus may alternatively include a greater number of power outputting parts.

The second power outputting part 170 includes coils L1 and L2 (i.e., inductances), diodes D2 through D5, capacitors C4 and C5, resistances R2 through R6, and a transistor TR3.

The coil L2 is used for a forward converter, and is charged with a current when a high voltage is supplied to the first coil of the power transforming part 150. When a low voltage is supplied to the first coil of the power transforming part 150, the current charged at the coil L2 flows through the capacitor C5 and the diode D4, and the current charged at the coil L2 supplements current shortages and outputs the second DC voltage Vb.

The coil L1 may be a MAG-AMP coil used for a magnetic amplifier. The magnetic amplifier controls load current by changes in an input current, using the fact that reactance of a coil changes depending on a current level thereof. That is, the magnetic amplifier prevents the first outputting part 160 from causing cross regulation to occur at the second power outputting part 170.

For example, if the current of the first power outputting part 160 rises and the second output voltage of the second power outputting part 170 increases, current "i" which represents the current charged at the coil L1 flows through the diode D3 and the transistor TR3, and the diode D2 is turned ON. The transistor TR3 is turned ON by the diode D5 (e.g., Programmable Shunt Diode or Zener diode) operating when the second output voltage Vb is greater than or equal to a first reference voltage.

When the second output voltage Vb is greater than or equal to the first reference voltage, the diode D2 is turned ON, and the diode D2 of the second power outputting part 170 and the transistor TR2 of the switching controlling part 130 are operated by a photo coupler. Accordingly, the capacitor C2 and the capacitor C3 are connected in parallel to the CT terminal of the PWM-IC 135 and the switching frequency output to the OUT terminal decreases, to reduce a switching loss.

The feedback circuit part 190 senses the second output voltage Vb of the second power outputting part 170 and transmits a feedback signal to an FB terminal of the PWM-IC 135. When the second output voltage of the second power outputting part 170 is greater than or equal to a second reference voltage, the feedback circuit part 190 transmits a stop feedback signal to stop an operation of the PWM-IC 135. Voltages of different levels may be used as the second reference voltage of the feedback circuit part 190 and the first reference voltage determined by the diode D5, respectively. In particular, the second reference voltage may be greater than the first reference voltage. Since general feedback circuits should be known to those of ordinary skill in the art, a detailed description of the feedback circuit part 190 will not be provided here.

Figure 3:
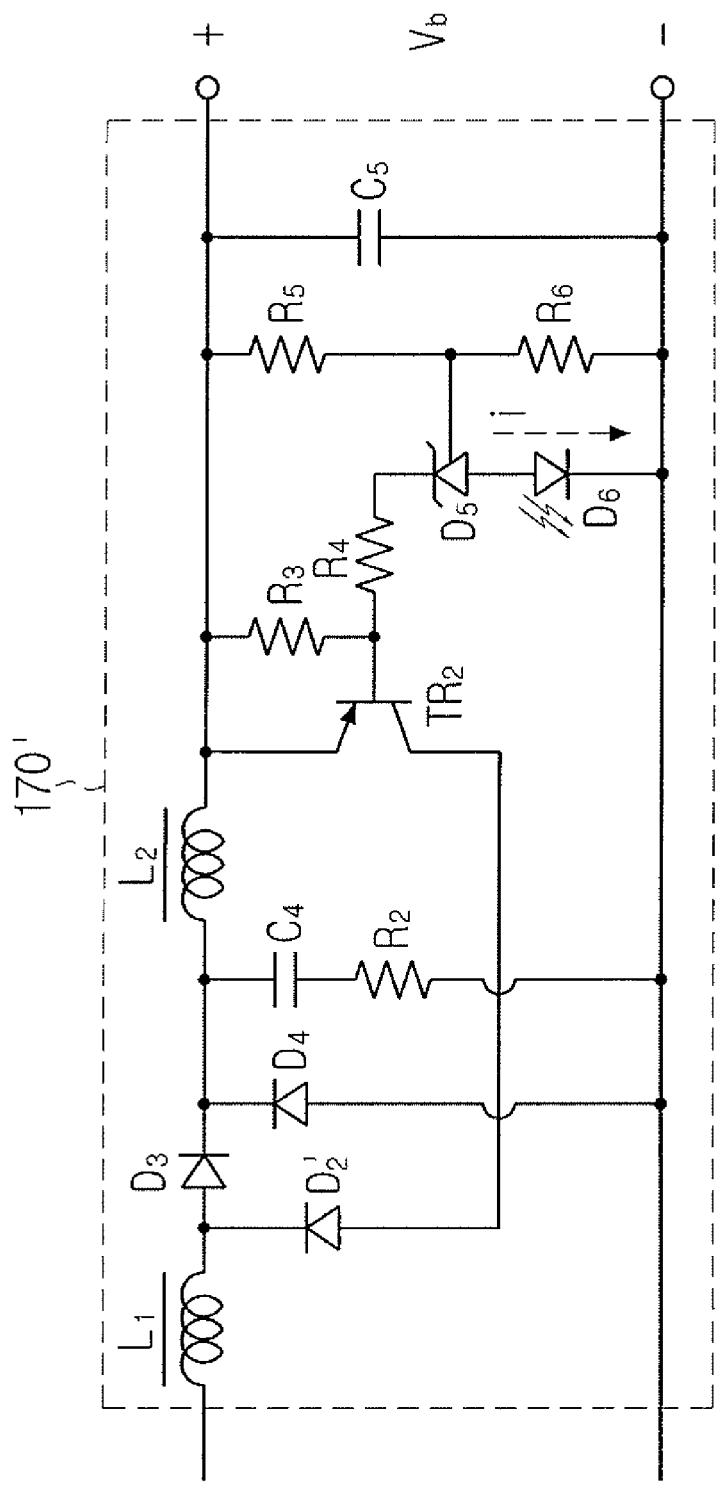
FIG. 3 illustrates a second power outputting part according to an exemplary embodiment of the present general inventive concept.

FIG. 3 illustrates another example of a second power outputting part 170'.

Referring to FIGS. 2 and 3, in the second power outputting part 170' of the switching power supply apparatus, a diode D6 is operated with the transistor TR2 as the photo coupler.

More particularly, when the second output voltage Vb of the second power outputting part 170 is greater than or equal to the first reference voltage, the diode D5 operates, the current "i" flows and the diode D6 turns ON. Accordingly, the capacitors C2 and C3 (see FIG. 2) are connected in parallel to the CT terminal of the PWM-IC 135. The switching frequency output to the OUT terminal decreases and the switching loss decreases.

Figure 4:
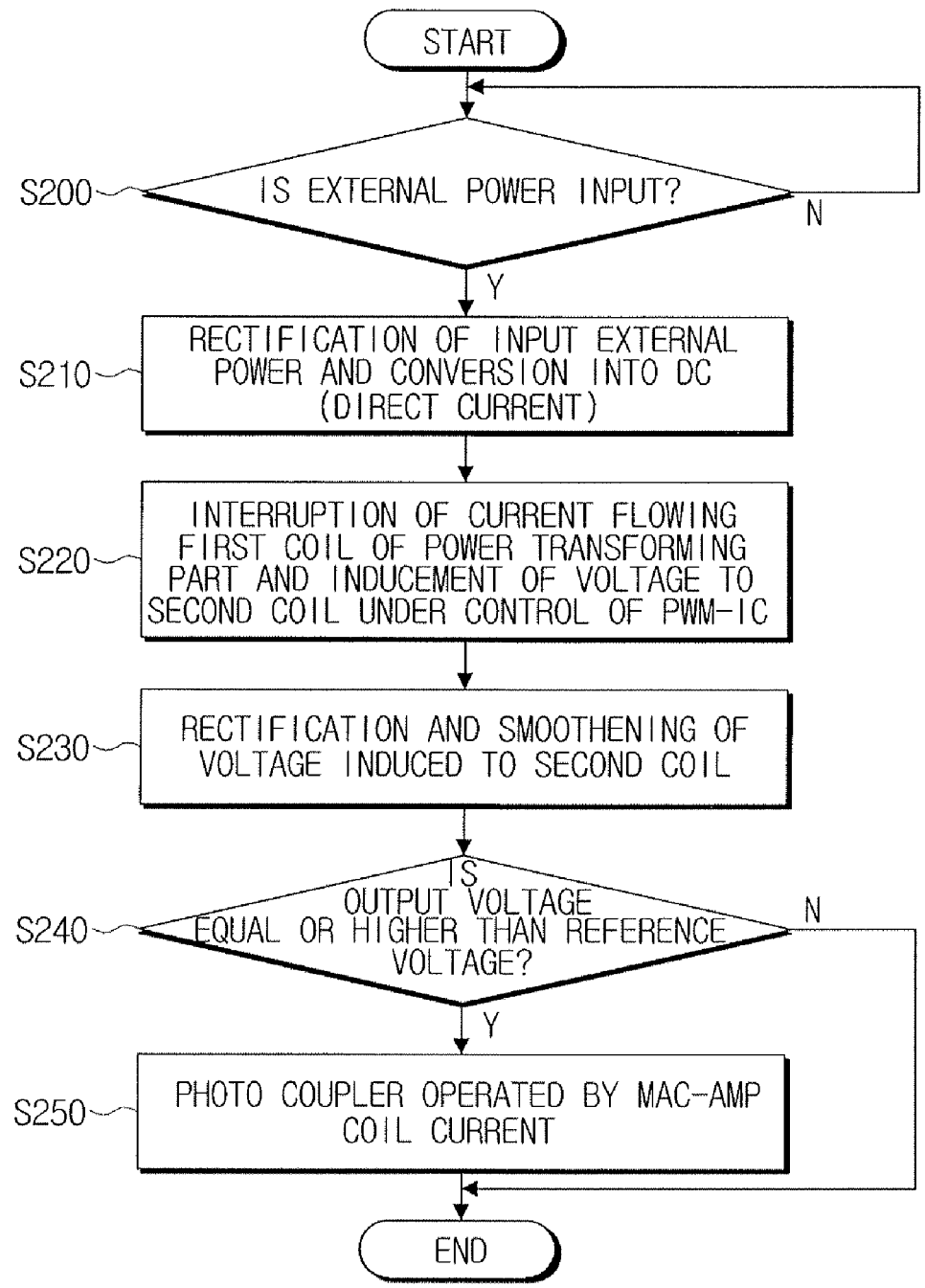
FIG. 4 is a flowchart illustrating an operation of the switching power supply apparatus according to an embodiment of the present general inventive concept.

FIG. 4 is a flowchart illustrating an operation of the switching power supply apparatus according to an embodiment of the present general inventive concept. The operation of the switching power supply apparatus is described below with reference to FIGS. 2 and 3.

Referring to FIGS. 2 and 4, when the external power is input (operation S200), the input external power is rectified and converted into the DC voltage. That is, the rectifying part 110 rectifies the external power input through the external power inputting part 100 using, for example, the bridge diode (not shown) and the condenser (not shown), and outputs the DC voltage (operation S210).

The PWM-IC 135 controls interruption of the current flowing in the first coil of the power transforming part 150 and the inducement of the voltage to the second coil. In other words, the DC voltage output from the rectifying part 110 is supplied to the first coil of the power transforming part 150 and the switching controlling part 130 interrupts the current flowing in the first coil of the power transforming part 150, thereby controlling the voltage induced to the second coil (operation S220).

The first and the second power outputting parts 160 and 170 (or 170') rectify and smooth the voltage induced to the second coil, and output the first and second output voltages Va and Vb, respectively (operation S230).

When the second output voltage output by the second power outputting part 170 (or 170') is greater than or equal to the first reference voltage at operation S240, the photo coupler is operated by the current "i." That is, if the second output voltage Vb is greater than or equal to the reference voltage, the current "i" charged to the coil L1 turns ON the diode D2 (see FIG. 2) or the diode D6 (see FIG. 3). When the diode D2 or the diode D6 are turned on, the transistor TR2 is operated by the diode D2 or the diode D6, and the photo coupler is turned ON.

Accordingly, the capacitor C2 and the capacitor C3 are connected in parallel to the CT terminal of the PWM-IC 135 such that the switching frequency output to the OUT terminal decreases, and the switching loss decreases.

The cross regulation is finished, and when the second output voltage Vb is maintained less than or equal to the first reference voltage, the current "i" does not flow, and the diode D2 (see FIG. 2) or the diode D6 (see FIG. 2) stop emitting the light. Finally, the capacitance connected to the CT terminal of the PWM-IC 135 gets normalized (i.e., back to C2) and the switching frequency gets back to an original state. The method may further include a feedback operation performed by the feedback circuit part 190. For example, the feedback operation may be performed continuously, periodically, or as part of the operation S240. As described above, the feedback operation can be used to cut off operation of the PWM-IC 135 when the second output voltage Vb is greater than or equal to the second reference voltage.

As described above, the coil L1 is actively operated when a sensed output voltage (i.e., the second output voltage Vb) is greater than or equal to a certain voltage level (i.e., the first reference voltage). As the second output voltage Vb increases, a switching frequency of the PWM-IC 135 decreases, so that switching loss decreases such that unnecessary power consumption and overvoltage-causing damage can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power supply apparatus, comprising:
   a transformer to receive an input voltage at a first coil and to output at least one output voltage on at least one second coil;
   a controller to switch the transformer ON and OFF at two or more operating frequencies to regulate the at least one output voltage according to a feedback signal; and
   at least one power output part to receive the at least one output voltage from the transformer, to output at least one output DC voltage, and to provide a first feedback signal to the controller to decrease the frequency with which the transformer is switched when the at least one output DC voltage is greater than a reference voltage level.

2. The power supply apparatus of claim 1, wherein the at least one power output part provides a second feedback signal to the controller to increase the frequency with which the transformer is switched when the at least one output DC voltage is reduced below the reference voltage level.

3. The power supply apparatus of claim 1, wherein the controller comprises:
   a transistor connected to the first coil of the transformer; and
   a switch control unit having an output terminal to operate the transistor to switch according to the two or more operating frequencies and a control terminal having a variable capacitance connected thereto that is variable between a first capacitance and a second capacitance to adjust the switching frequency of the transformer when the feedback signal is received.

4. The power supply apparatus of claim 3, wherein the variable capacitance connected to the control terminal comprises:
   a first capacitor connected to the control terminal of the switch control unit;
   a three terminal switching device connected in parallel with the first capacitor to be operated between an ON state and an OFF state by the feedback signal; and
   a second capacitor connected in parallel with the first capacitor when the three terminal device is operated in the ON state and not to be connected in parallel with the first capacitor when the three terminal device is operated in the OFF state.

5. The power supply apparatus of claim 4, wherein:
   the at least one power output part comprises a photodiode to output a light signal when the at least one output DC voltage is greater than the reference voltage level; and
   the three terminal switching device comprises a phototransistor to operate in the ON state when activated by the light signal received from the photodiode.

* * * * *